(12) United States Patent
Vesikivi (10) Patent No.: US 7,483,721 B1
(45) Date of Patent: Jan. 27, 2009

(54) COMMUNICATION DEVICE PROVIDING DIVERSE AUDIO SIGNALS TO INDICATE RECEIPT OF A CALL OR MESSAGE

(75) Inventor: Petri Vesikivi, Espoo (FI)

(73) Assignee: Nokia Corporation, Espoo (FI)

( * ) Notice: Subject to any disclaimer, the term of this patent is extended or adjusted under 35 U.S.C. 154(b) by 1440 days.

(21) Appl. No.: 10/051,021

(22) Filed: Jan. 22, 2002

(51) Int. Cl.
*H04B 1/38* (2006.01)

(52) U.S. Cl. .................. 455/567; 455/3.06; 455/87; 455/553.1; 455/556.1

(58) Field of Classification Search .......... 455/415, 455/567, 3.06, 401, 426.1, 75, 77, 3.04, 414.1, 455/552.1, 553.1, 556.1, 93, 150.1, 179.1, 455/178.1
See application file for complete search history.

(56) References Cited

U.S. PATENT DOCUMENTS

| | | | |
|---|---|---|---|
| 4,582,956 A | | 4/1986 | Doughty |
| 5,095,503 A | | 3/1992 | Kowalski |
| 5,303,284 A | * | 4/1994 | Shinozaki .............. 455/567 |
| 5,317,622 A | * | 5/1994 | Shinozaki .............. 455/567 |
| 5,337,356 A | * | 8/1994 | Shinozaki .............. 379/418 |
| 5,841,850 A | * | 11/1998 | Fan ................... 379/142.06 |
| 5,867,794 A | * | 2/1999 | Hayes et al. ............ 455/557 |
| 6,181,928 B1 | * | 1/2001 | Moon .................. 455/415 |
| 6,961,559 B1 | * | 11/2005 | Chow et al. ............ 455/414.1 |
| 7,171,174 B2 | * | 1/2007 | Ellis et al. ............. 455/132 |
| 7,224,999 B1 | * | 5/2007 | Yamaguchi ............ 455/566 |
| 7,257,398 B1 | * | 8/2007 | Ukita et al. ............. 455/420 |
| 2003/0096639 A1 | * | 5/2003 | Cluff et al. ............. 455/567 |
| 2003/0119443 A1 | * | 6/2003 | Futohashi ............. 455/3.06 |
| 2004/0203944 A1 | * | 10/2004 | Huomo et al. .......... 455/466 |

* cited by examiner

*Primary Examiner*—Charles N Appiah
*Assistant Examiner*—Joy K Contee
(74) *Attorney, Agent, or Firm*—Banner & Witcoff, Ltd.

(57) ABSTRACT

A communication device including a caller identification feature. Radio frequencies are associated with preferred calling numbers. When a telephone call is received from a preferred calling number, a radio is tuned to the associated frequency. When an SMS message or an MMS message is received, the radio is tuned to an associated frequency. The person receiving the telephone call or message may be able to identify the calling number by the particular radio station. Further, the invention is a method of indicating the telephone number of a calling telephone or receipt of an SMS message or MMS message by tuning a radio to an associated frequency. The invention also includes a storage medium having instructions which control a communication device to indicate a telephone number identifying a telephone from which a telephone call originated or to indicate receipt of an SMS or a MMS message.

60 Claims, 7 Drawing Sheets

COMMUNICATION DEVICE PROVIDING DIVERSE AUDIO SIGNALS TO INDICATE RECEIPT OF A CALL OR MESSAGE

FIELD OF THE INVENTION

The present invention pertains to communication devices. More particularly, the present invention pertains to a combination telephone and radio providing diverse audio signals to indicate receipt of a call or message.

BACKGROUND OF THE INVENTION

A telephone to which an incoming call is directed receives an incoming call signal which includes alternating ringing current intervals and silent intervals. By way of example, each ringing current interval might have a duration in the order of about two seconds, and each silent interval might have a duration in the order of about four seconds. During the ringing current intervals, a current at the receiving telephone activates an indicator which provides an indication of an incoming call, for example by causing an audible ringing tone. During the silent intervals, other information might be transmitted to the receiving telephone at a frequency which does not activate the incoming call indicator. U.S. Pat. No. 4,582,956, the disclosure of which is incorporated herein by reference, shows a method and apparatus for providing information at a telephone during the silent interval between ringing current intervals. One type of information that might be transmitted during the silent intervals is caller identification information which indicates the telephone number of the telephone from which the incoming call originated.

Many, telephones have the ability to respond to the caller identification information by providing an indication of the telephone number of the originating telephone. When the caller identification is indicated in a visual display on the telephone, it is necessary for the person receiving the call to observe that display in order to determine the identity of the calling number. With a cellular telephone, this might involve removing the telephone from a carrying case in order to view the display. With a land line telephone, it might involve going to the telephone to view the display. Even if the person does not wish to answer incoming calls from certain persons or from unknown persons, still it is necessary for him or her to view the telephone display in order to determine whether the call is from someone with whom he or she wishes to talk.

Telephones are available in which a listing of preferred calling numbers is stored, and when a call is received from one of those stored numbers, a unique ringing tone is provided. Thus, each of several preferred calling numbers can have its own unique ringing tone. In order to be distinguishable, there must be a reasonable difference between the several unique ringing tones. Only a limited number of ringing tones are available. Users of telephones, particularly cellular telephones like to have unique and surprising indications of an incoming call. Further, such telephones frequently are able to receive short message service ("SMS") messages and multimedia messaging service ("MMS") messages. Users of such telephones like to have unique indications of receipt of those messages.

SUMMARY OF THE INVENTION

To overcome limitations in the prior art described above, and to overcome other limitations, the present invention is directed to a communication device capable of providing users with diverse indications of receipt of a telephone call or of a message.

In a first aspect, the present invention is a communication device, such as a combination telephone and radio, including a caller identification feature in which a unique radio frequency can be associated with each of a plurality of preferred calling numbers or message types so that when a call is received from one of the preferred calling numbers or when an SMS or MMS message is received, the radio is tuned to the associated frequency. If a call is received from a calling number other than the preferred calling numbers, for example an unrecognized calling number, the radio can be tuned to a default frequency or, alternatively, a ringing circuit can be activated. As a consequence, the person receiving the telephone call may be able to identify whether the call is from a preferred calling number and may be able to identify the calling number by the particular radio frequency or radio station to which the radio is tuned in response to the incoming call. In addition, the communication device of a preferred embodiment of the present invention can tune the radio to an associated radio station in response to receipt of an SMS message or in response to receipt of an MMS message. Thus, the present invention provides a unique, entertaining, and appealing communication device.

There are a large number of radio frequencies or radio stations available, including both FM radio stations and AM radio stations. In addition, some radios are able to receive other frequency bands, for example a short wave band or an amateur radio band. Thus, a large number of preferred callers can be accommodated. Responding to the incoming call by turning on a radio station can provide a more pleasant, less disruptive indication of the incoming call.

In a second aspect, the present invention is a method of indicating the telephone number of the telephone from which an incoming telephone call originated or of indicating receipt of an SMS message or receipt of a MMS message.

In a third aspect, the present invention is an article in the form of a storage medium having instructions stored thereon, the instructions when executed controlling a communication device to indicate a telephone number identifying a telephone from which a telephone call originated or to indicate receipt of an SMS message or of an MMS message.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF PREFERRED EMBODIMENTS

In the following description of various embodiments of the present invention, reference is made to the accompanying drawings which form a part hereof, and in which are shown by way of illustration various embodiments in which the invention may be practiced. It is to be understood that other embodiments may be utilized, and that structural and functional modifications may be made without departing from the scope of the present invention. In particular, while the following detailed description makes reference to the communication device of the present invention as a combination telephone and radio, other embodiments of communication devices might also be provided in accordance with the invention.

Figure 1:
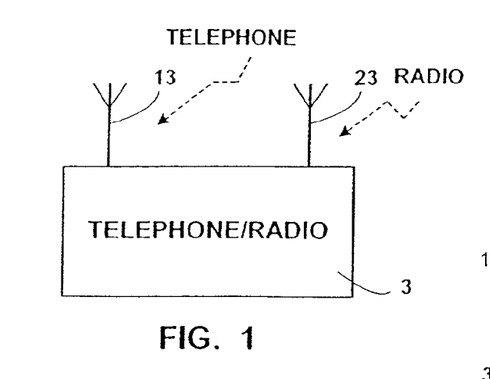
FIG. 1 is a diagrammatic depiction of a first embodiment of a communication device in accordance with the present invention.

FIG. 1 depicts a cellular combination telephone and radio 3 which includes an antenna 13 to receive telephone messages and an aerial or antenna 23 to receive radio signals according to an embodiment of the present invention. If desired, a single antenna may be provided for receipt of both the telephone messages and the radio signals. The cellular telephone has a uniquely assigned telephone number such as 789-555-1234 so that telephone calls placed to that number are received by the telephone section of combination telephone and radio 3.

Figure 2:
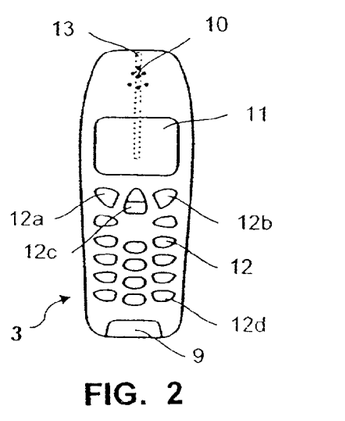
FIG. 2 is a plan view of an embodiment of a communication device in accordance with the present invention.

Referring to FIG. 2 illustrating one embodiment of the device of the present invention, the combination telephone and radio device 3 is at least dual-function in that it provides mobile telephone functionality and broadcast radio receiver functionality. The device 3 includes a microphone 9, a speaker 10, display panel 11 such as a liquid crystal display (LCD), a keypad 12 and an internal antenna element 13. The keypad 12 includes first and second soft keys 12a, 12b, a bi-directional scroll key 12c and a set of alphanumeric keys 12d.

Figure 3:
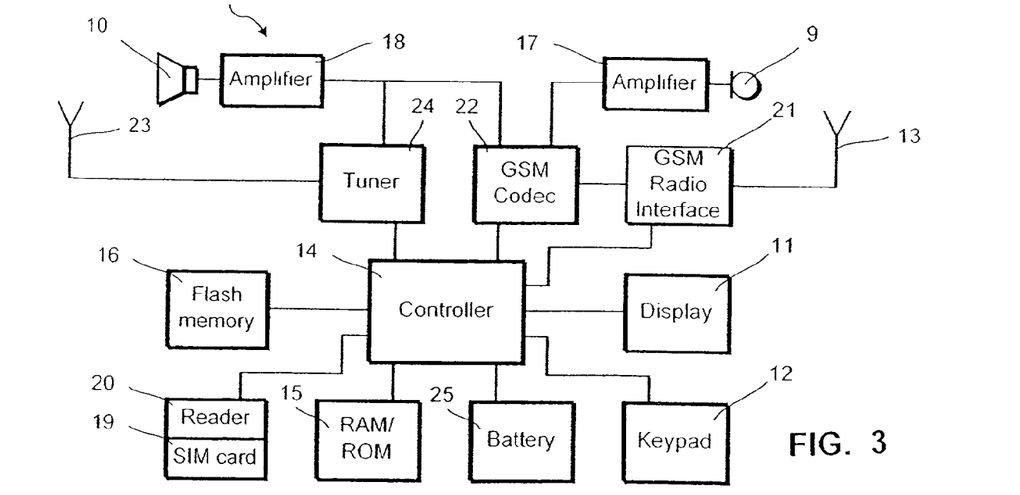
FIG. 3 is a block diagram of an embodiment of the communication device of FIG. 1.

Referring to FIG. 3, a circuitry of the mobile communications device 3, includes a microcontroller 14, and memories such as a RAM/ROM 15 and a flash memory 16. Electrical analog signals are produced by microphone 9 and amplified by an amplifier 17. Similarly, analog audio signals are fed to speaker 10 through an amplifier 18. The microcontroller 14 receives instructions from the keypad 12 and controls operation of the display 11. Information concerning the identity of the user of the mobile communications device 3 is held on a smart card 19, for example in the form of a subscriber identity module (SIM) card for mobile telephones that conforms to the global system for mobile communications (GSM). The SIM card 19 is removably received in a SIM card holder or reader 20 connected to the microcontroller 14. Microphone 9 and speaker 10 preferably are able to permit operation of combination telephone and radio 3 as a telephone in either a "private" mode, with speaker 10 adjacent the user's ear, or a "speakerphone" mode, with speaker 10 remote from the user's ear, as determined by a manual control (not shown) operated by the user.

Communication radio signals to and from the mobile telephone network are transmitted and received by means of antenna element 13 connected through an r.f. stage 21 to a coder/decoder (codec) 22 which is configured to process signals under the control of the microcontroller 14. Broadcast radio signals are received by internal aerial 23 connected to a tuner 24. It will be appreciated that a single antenna can be used to feed signals to the both r.f. stage 21 and the tuner 24. It will also be appreciated that the tuner 24 may be integrated into the r.f. stage 21. The device 3 is powered by a rechargeable battery 25 or other power source.

When the device 3 is used as a mobile telephone handset, the codec 22 receives analog signals from the microphone amplifier 17, digitizes them into a form suitable for transmission and feeds them to the r.f. stage 21 for transmission through the antenna element 13 for transmission to the mobile telephone network. Similarly, signals received from the telephone network are fed through the antenna element 13 to be demodulated by the r.f. stage 21 and fed to codec 22 so as to produce analogue signals which are fed though the amplifier 18 to speaker 10. When the device 3 is used as a radio set, received radio signals are fed through the aerial 23 to the tuner 24 where they are demodulated and fed through the amplifier 18 to speaker 10. Thus, the mobile communications device 3 can be used as a mobile communications handset for voice and data services and as a radio set. These functions are controlled by microcontroller 14 and can be performed separately or simultaneously. For example, a user can send a text message while listening to the radio.

Figure 4:
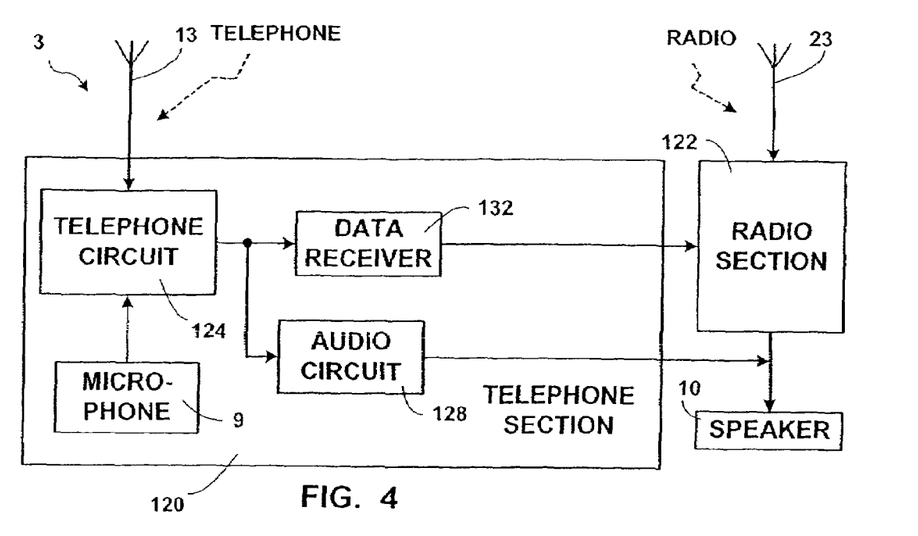
FIG. 4 is another block diagram of an embodiment of the communication device of FIG. 1.

The circuitry of FIG. 3 relates to the receipt and transmission of messages and radio signals. The circuitry of FIG. 4 relates to the receipt of signals indicating an incoming telephone call, SMS message or MMS messages. As seen in FIG. 4, combination telephone and radio 3 preferably includes a telephone section 120 which is connected to antenna 13 and a radio section 122 which is connected to aerial 23. As set forth above, telephone section 120 and radio section 122 may be connected to a single antenna, if desired. Telephone section 120 includes a telephone circuit 124 which is connected to antenna 113, and to which are connected microphone 9 and an audio circuit 128. Speaker 10 is connected to audio circuit 128 and to radio section 122. Alternatively, separate speakers can be provided for telephone section 120 and radio section 122. When a telephone call directed to combination telephone and radio 3 is received at antenna 13, telephone circuit 124 causes an indication of that incoming call. While a telephone call is in progress, either a call received by combination telephone and radio 3 or a call originated from combination telephone and radio 3, the outgoing audio signals from microphone 9 are processed by telephone circuit 124 and applied to antenna 13, while the received telephone signals are processed by telephone circuit 124 and applied through audio circuit 128 to speaker 10. Telephone circuit 124 further includes display 11 and keypad 12. Signals resulting from the keypad are transmitted by antenna 13.

Figure 5:
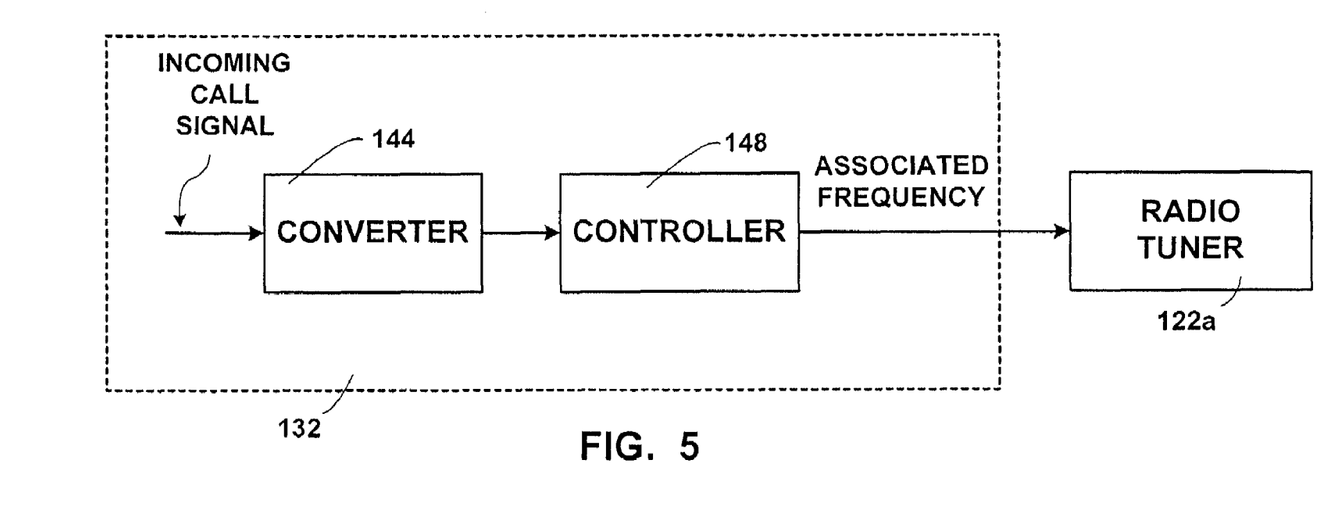
FIG. 5 is a block diagram of an embodiment of data receiver suitable for use in the communication device of FIG. 4.

A data receiver 132 is also connected to telephone circuit 124. The output of data receiver 132 is connected to radio section 122. FIG. 5 is a block diagram of an embodiment of a data receiver suitable for use as data receiver 132 in telephone section 120. When antenna 13 receives a signal indicating a telephone call for combination telephone and radio 3, telephone circuit 124 applies an incoming call signal to data receiver 132. Within the data receiver of FIG. 5, the incoming call signal is applied to converter 144. Converter 144 determines whether a caller identification signal is present during the silent interval between ringing intervals. If a caller identification signal is present, converter 144 converts the caller identification signal to a serial bit stream indicative of the telephone number of the calling telephone. By way of example, when the caller identification signal is a frequency shift keyed signal, converter 144 might include a frequency shift keyed modem connected to a frequency standard. Converter 144 applies the resulting serial bit stream to controller 148. If no caller identification number is present, converter 144 provides a signal indicating that to controller 148. The output of controller 148 is applied to radio tuner 122a within radio section 122.

Figure 6:
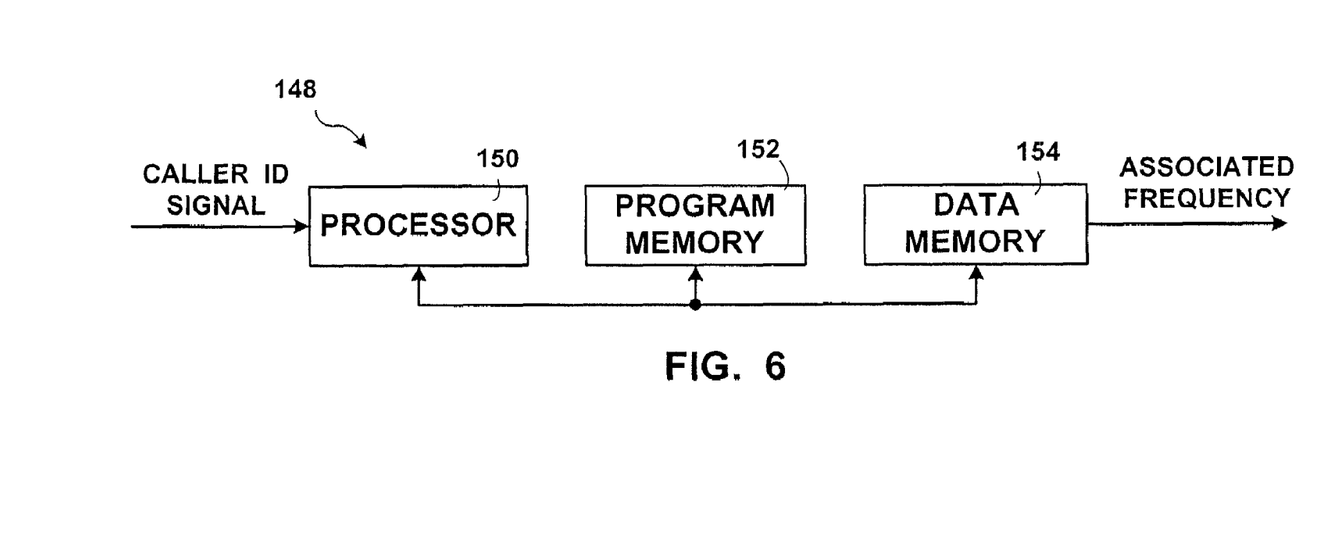
FIG. 6 is a block diagram of a controller suitable for use in the data receiver of FIG. 5.

FIG. 6 is a block diagram of a processing system suitable for use as controller 148. The signal from converter 144 is applied to a processor 150 which is connected to a program memory 152 and a data memory 154. By way of examples, program memory 152 might be a read only memory, such as an EPROM, while data memory 154 might be a random access memory. Data memory 154 stores a list of preferred telephone numbers, together with associated radio frequencies. In accordance with a program stored in program memory 152, processor 150 determines whether the received caller identification signal is the same as any caller identification signal stored within data memory 154. If so, then processor 150 causes data memory 154 to output the associated frequency signal to radio tuner 122a (FIG. 5) within radio section 122, activating the radio tuner at that frequency to provide the audio signals received by way of antenna 13. Data memory 154 also stores a default radio frequency, and if no caller identification signal was detected, or if the caller identification signal is an unrecognized caller identification signal that is not the same as any stored in data memory 154, then processor 150 causes data memory 154 to output the default radio frequency to radio tuner 122a, activating the tuner at that frequency.

Figures 7, 13:
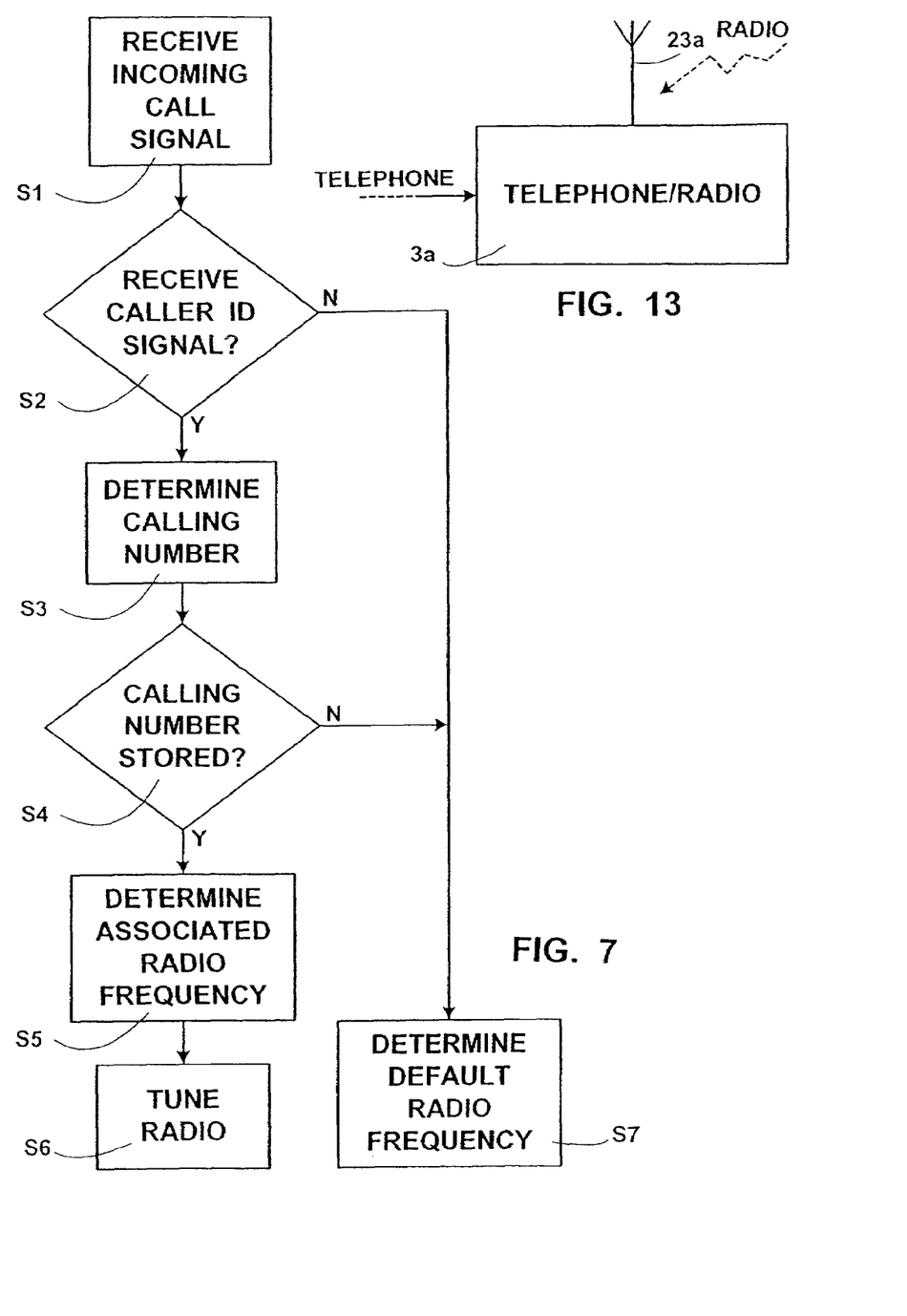
FIG. 7 is a flowchart of an embodiment of a method of indicating a telephone number identifying a telephone from which an incoming telephone call originated in accordance with the present invention.
FIG. 13 is a diagrammatic depiction of a another embodiment of a communication device in accordance with the present invention.

FIG. 7 is a flow chart of the operation of the combination telephone and radio 3 of FIG. 1 according to one embodiment of the present invention. In step S1, an incoming call signal is received. Some telephones block the transmission of a caller identification signal to telephones to which calls are made, and so in step S2 it is determined whether a caller identification signal has been received. If so, then in step S3 the calling number is determined. In step S4 it is determined whether the calling number is stored within data memory 154. If so, then in step S5 the associated radio frequency is determined, and in step S6, radio section 122 is tuned to the determined radio frequency.

If the calling telephone blocked the caller identification signal, then in step S2 no caller identification signal is received, and so the method advances to step S7 in which radio section 122 is tuned to the default radio frequency. Likewise, in step S4 if the calling number is an unrecognized calling number that is not stored within data memory 154, then the method advances to step S7 and the radio section is tuned to the default frequency.

Figure 8:
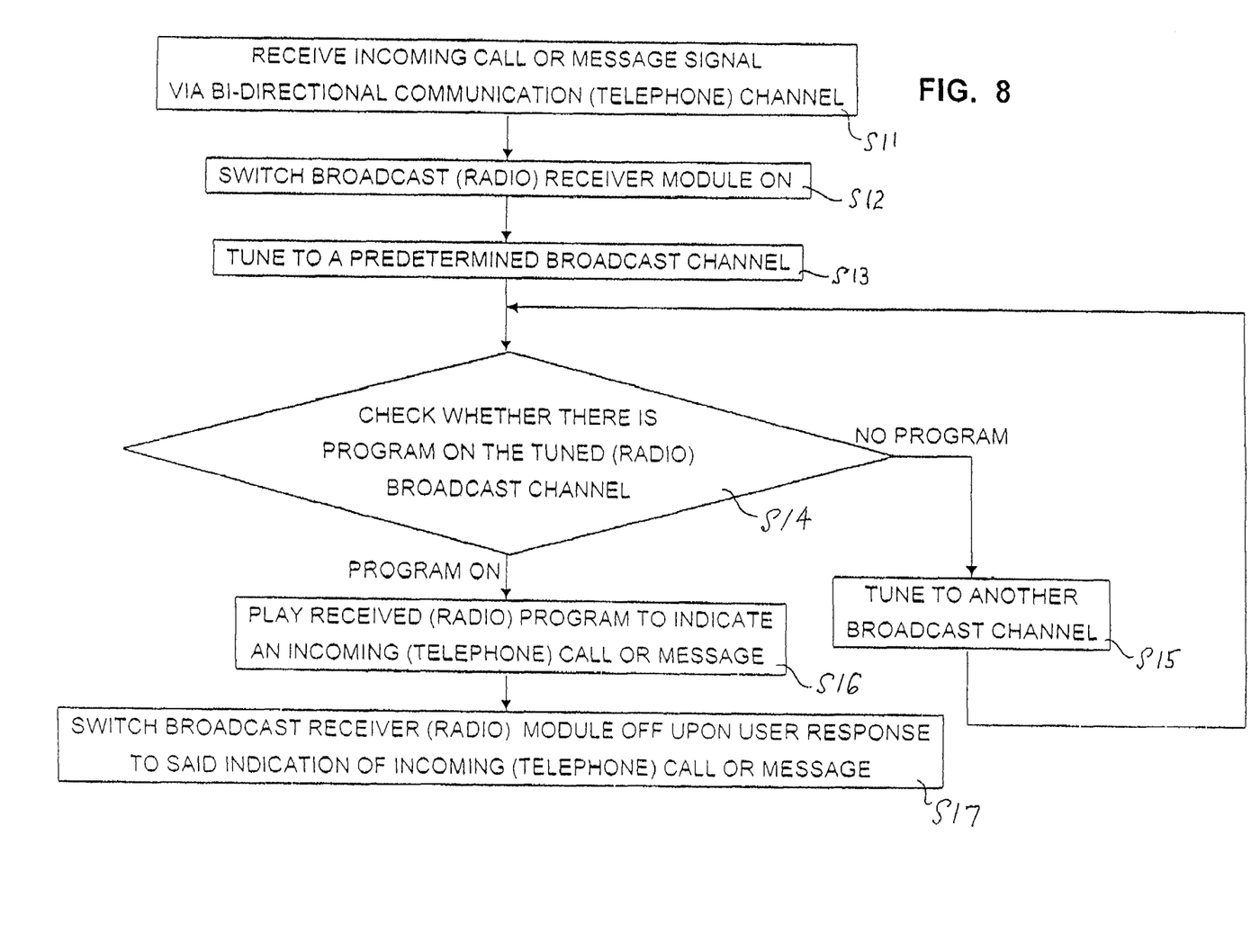
FIG. 8 is a flowchart of an embodiment of a method of operating a communication device in accordance with the present invention.

FIG. 8 is a flow chart of the operation of radio section 122 under the control of telephone section 120 according to one embodiment of the present invention. In step S11, telephone section 120 receives an incoming call or message signal. In step S12 controller 148 switches radio section 122 on, and in step S13, controller 148 tunes radio tuner 122a to a particular frequency, either a frequency associated with the identified calling telephone number or the default frequency. In step S14 controller 148 determines whether a program is being broadcast on the tuned frequency. If not, then in step S15 controller 148 tunes the tuner to another frequency, for example the default frequency. If step S14 determines that a program is being broadcast, then in step S16 the received broadcast is played through speaker 10 to indicate receipt of a telephone call. Once the user of the combination telephone and radio responds to the indication of the incoming call, for example by answering the call, radio section 122 is deactivated in step S17.

Figure 9:
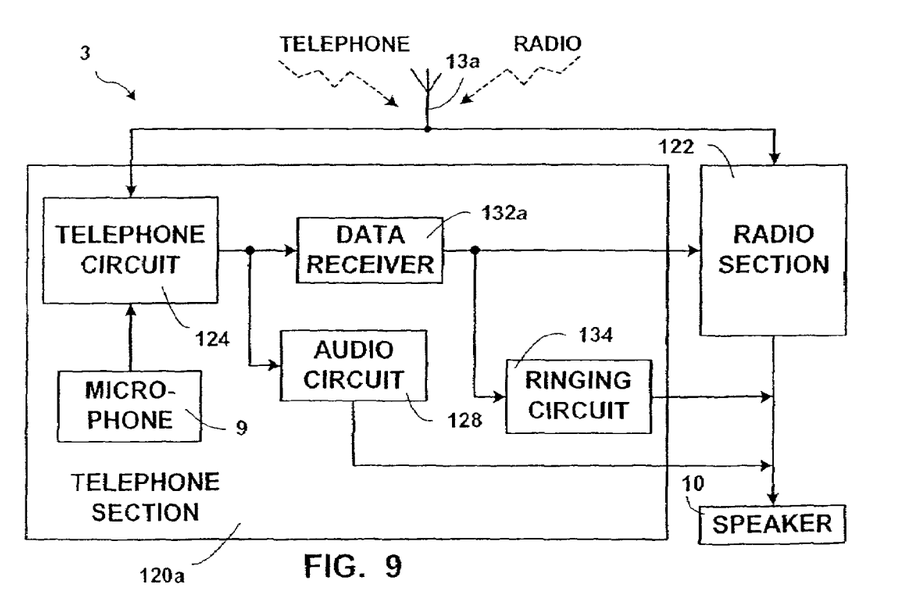
FIG. 9 is a block diagram of another embodiment of the communication device of FIG. 1.

FIG. 4 depicts a combination telephone and radio 3 in which every incoming call results in tuning of radio section 122 to a radio frequency, either a radio frequency associated with the calling number or the default radio frequency. FIG. 9 is a block diagram of a combination telephone and radio 3a in which incoming calls for which a caller identification signal can not be associated with a telephone number results in activation of a ringing circuit, rather than tuning of the radio to a default station. Combination telephone and radio 3a includes a telephone section 120a which differs from telephone section 120 of FIG. 4 by having a ringing circuit 134 with an input connected to data receiver 132a and an output connected to speaker 10 to provide an electronically generated ringing signal to indicate an incoming call. FIG. 9 also illustrates that the telephone section and the radio section can utilize the same antenna 13a.

Figure 10:
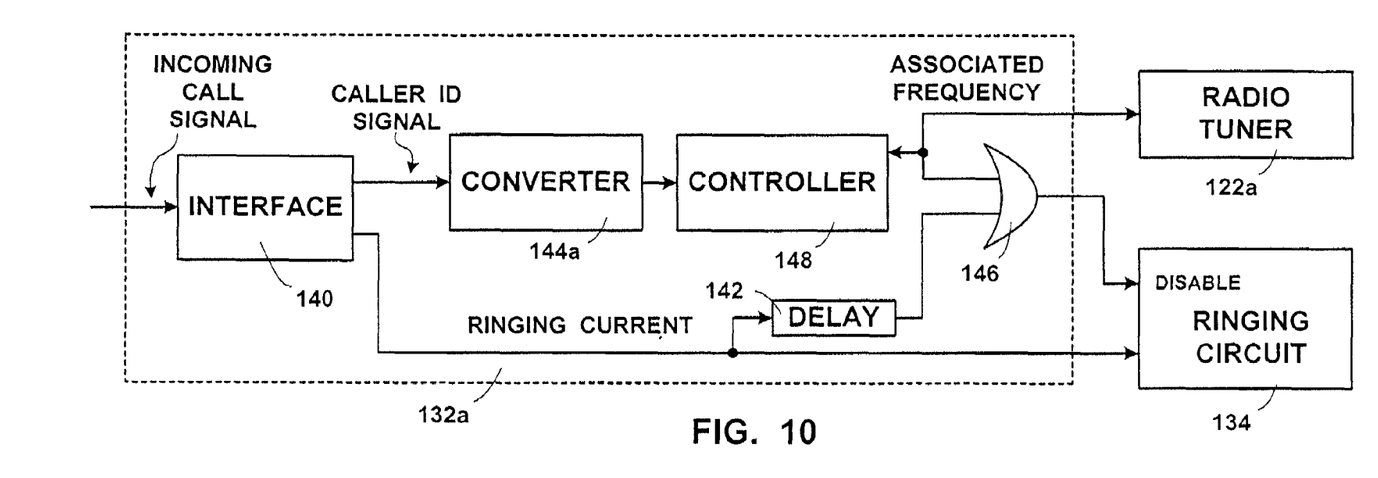
FIG. 10 is a block diagram of an embodiment of a data receiver suitable for use in the communication device of FIG. 9.

FIG. 10 is a block diagram of an embodiment of a data receiver suitable for use as data receiver 132a in telephone section 120a. Within the data receiver of FIG. 10, the incoming call signal is applied to interface unit 140 from which the ringing current is applied to ringing circuit 134 and to delay circuit 142, while any caller identification signal received during the silent intervals is applied to converter 144a. The output of delay circuit 142 passes through OR gate 146 to a disable input of ringing circuit 134, preventing the ringing signal of the first ringing current interval from activating ringing circuit 134. If no caller identification signal is present, then subsequent ringing current intervals activate ringing circuit 134. Converter 144a converts any caller identification signal to a serial bit stream and applies the serial bit stream to controller 148. The output of controller 148 is applied to radio tuner 122a within radio section 122 and is applied through a second input of OR gate 146 to the disable input of ringing circuit 134, preventing subsequent ringing current intervals from activating the ringing circuit.

Figure 11:
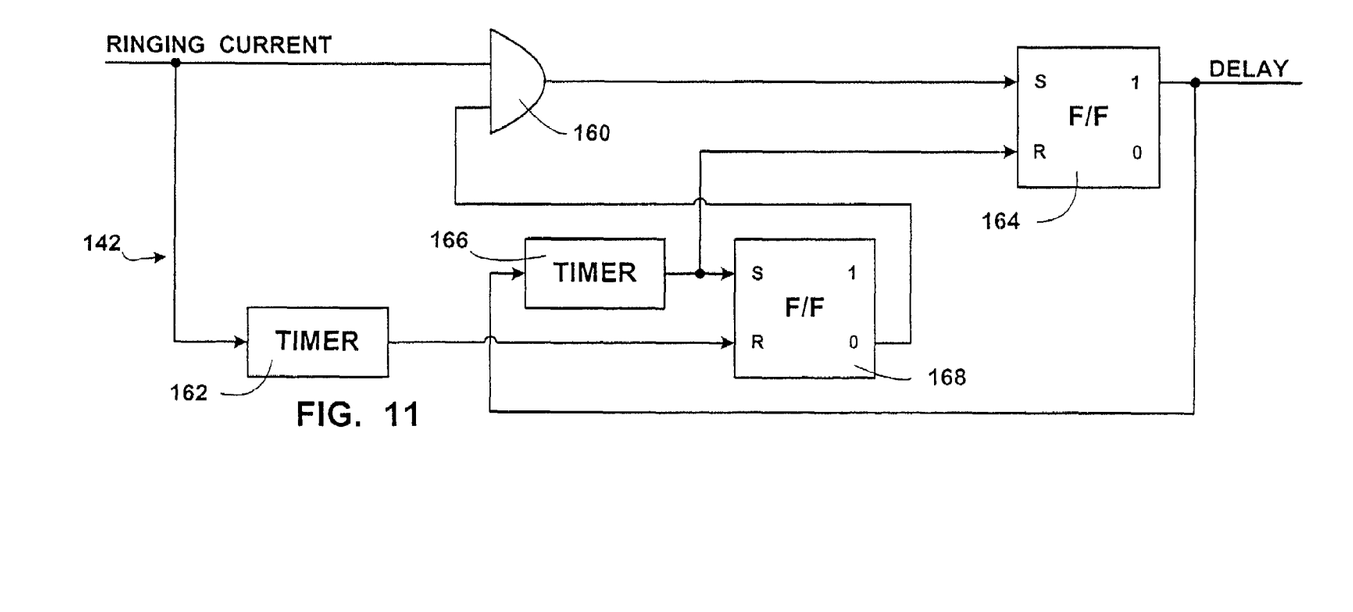
FIG. 11 is a block diagram of a delay circuit suitable for use in the data receiver of FIG. 10.

FIG. 11 is a block diagram of an embodiment of a delay circuit suitable for use as delay circuit 142 in the data receiver of FIG. 10. The ringing current is applied to one input of AND gate 160 and to timer 162. The output of AND gate 160 is applied to the set input of flip flop 164, the 1 output of which provides the delay signal. The 1 output of flip flop 164 is also applied to timer 166. The output of timer 166 is applied to the set input of flip flop 168 and to the reset input of flip flop 164. The output of timer 162 is applied to the reset input of flip flop 168. The 0 output of flip flop 168 is applied to the second input of AND gate 160.

In the quiescent condition, flip flops 164 and 168 are reset, and so AND gate 160 is enabled. The ringing current then passes through AND gate 160 to set flip flop 164, initiating the delay signal which disables ringing circuit 134. The delay signal also starts timer 166 which, after a time slightly greater then the duration of the first ringing current interval, sets flip flop 168 and resets flip flop 164, ending the delay signal. Absence of the 0 output from flip flop 168 blocks further ringing current signals from passing through AND gate 160. If the calling number has been identified, then the associated frequency signal from controller 148 passes through OR gate 146 (FIG. 10) to maintain ringing circuit 134 disabled. That associated frequency signal also activates radio tuner 122*a* to provide an audio output of the radio station at the associated frequency. If the calling number has not been identified, ringing circuit 134 is no longer disabled, and so ringing signals during subsequent ringing current intervals activate the ringing circuit.

The ringing signal during the first ringing current interval also starts timer 162 within the delay circuit of FIG. 11. Timer 162 times a time greater than the duration of the ringing current interval and is restarted by the ringing signal of each ringing current interval, thus maintaining flip-flop 168 set and so blocking AND gate 160. Once ringing signals are no longer received, either because the phone has been answered or because the caller has hung up, timer 162 resets flip flop 168, returning the delay circuit to the quiescent condition.

Figure 12:
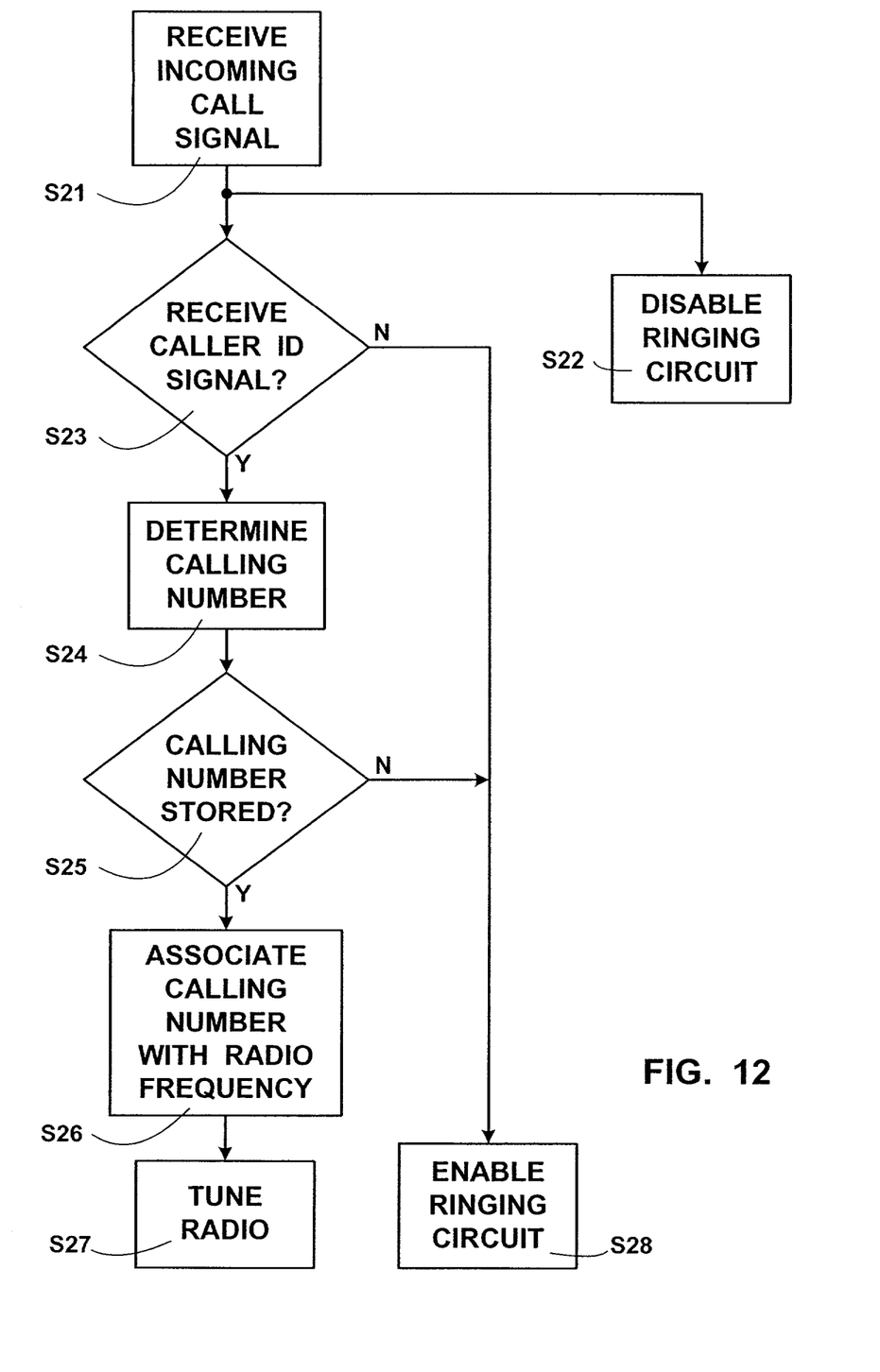
FIG. 12 is a flowchart of another embodiment of a method of indicating a telephone number identifying a telephone from which an incoming telephone call originated in accordance with the present invention.

FIG. 12 is a flow chart of the operation of the combination telephone and radio of FIG. 9 according to one embodiment of the present invention. In step S21, an incoming call signal is received. In step S22 delay circuit 142 disables ringing circuit 134. In step S23 it is determined whether a caller identification signal has been received. If so, then in step S24 the calling number is determined, and in step S25 it is determined whether the calling number is stored within data memory 154. If so, then in step S26 the associated radio frequency is determined, and in step S27, the radio section 122 is tuned to the associated frequency.

If the calling telephone blocked the caller identification signal, then in step S23 no caller identification signal is received, and so the method advances to step S28 in which the ringing circuit is enabled. Likewise, in step S25 if the calling number is not stored within data memory 154 and so is unrecognized, then the method advances to step S28 and the ringing circuit is enabled.

Figure 14:
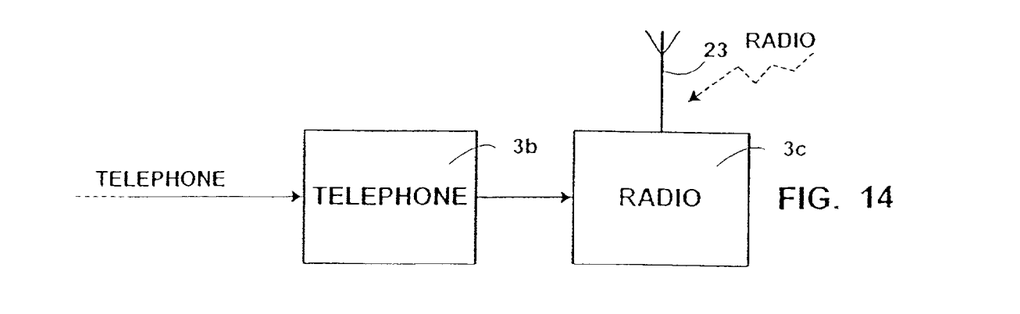
FIG. 14 is a diagrammatic depiction of still another embodiment of a communication device in accordance with the present invention.

FIG. 1 illustrates the present invention in the form of a cellular telephone/radio. FIG. 13 depicts the present invention in the form of a combination telephone and radio 3*a* which has a landline telephone, rather than a cellular telephone. FIG. 14 illustrates the present invention in the form of a combination telephone and radio made up of a discrete telephone component 3*b* and a discrete radio component 3*c* which are coupled together by the associated frequency output line from controller 148.

Although various components of the combination telephone and radio of the present invention have been depicted in hardware implementations, preferably the combination telephone and radio is implemented with software on an appropriate processing system.

The present invention thus provides a communication device which determines whether a calling telephone number is associated with a particular radio frequency, and if so automatically tunes the radio to that frequency and which responds to SMS messages and MMS messages by tuning the radio to an associated frequency. Although the present invention has been described with reference to preferred embodiments, various alterations, rearrangements, and substitutions can be made, and still the result will be within the scope of the invention.

What is claimed is:

1. An apparatus comprising:
   means for receiving a first signal indicative of presence of an incoming telephone call;
   means for receiving a second signal indicative of a number identifying a telephone from which the incoming telephone call originated;
   means for determining the indicated number;
   means for associating the determined number with a radio frequency; and
   means for tuning a radio to the associated radio frequency.

2. An apparatus comprising:
   a telephone circuit configured to receive a first incoming signal indicative of a first identifying number identifying said apparatus, to indicate presence of an incoming call intended for the apparatus; and
   a radio section configured to receive radio signals of various radio frequencies, said radio section configured to respond to receipt of the first incoming signal by the telephone circuit to select a radio signal of one of the radio frequencies and to provide an audio output of an audio signal derived from the selected radio signal.

3. An apparatus as claimed in claim 2, wherein said telephone circuit is further configured to receive a second incoming signal indicative of a second identifying number identifying a telephone from which the incoming call originated.

4. An apparatus as claimed in claim 3, further comprising a data receiver configured to store selected telephone identifying numbers and associate the stored telephone identifying numbers with particular ones of the radio frequencies, said data receiver configured to respond to receipt by said telephone circuit of a second incoming signal indicative of a stored telephone identifying number to cause said radio section to provide an audio output of an audio signal derived from the particular radio signal frequency associated with the indicated stored telephone identifying number.

5. An apparatus as claimed in claim 4, wherein said data receiver is further configured to respond to receipt by said apparatus of a second incoming signal indicative of an unstored telephone identifying number and to tune the radio to a default radio frequency.

6. Apparatus as claimed in claim 4, wherein said data receiver comprises a processing system.

7. An apparatus as claimed in claim 4, further comprising a ringing circuit configured to provide a ringing signal indicating receipt of the first incoming signal, and wherein said data receiver is further configured to respond to receipt by said telephone circuit of a second incoming signal indicative of an unstored telephone identifying number and to enable said ringing circuit to provide the ringing signal.

8. An apparatus as claimed in claim 2, wherein said apparatus comprises a cellular telephone.

9. An apparatus as claimed in claim 2, wherein said apparatus comprises a land-line telephone.

10. An apparatus as claimed in claim 2, wherein said apparatus is configured to respond to receipt of a short message service message by the apparatus to select a radio signal of a radio frequency associated with short message service messages and to provide an audio output of an audio signal derived from the selected radio signal.

11. An apparatus as claimed in claim 2, wherein said apparatus is configured to respond to receipt of a multimedia message service message by the apparatus to select a radio signal of a radio frequency associated with multimedia message service messages and to provide an audio output of an audio signal derived from the selected radio signal.

12. An apparatus, comprising:
    a telephone circuit configured to receive a first incoming signal indicative of a first identifying number identifying said apparatus, to indicate presence of an incoming call intended for the apparatus, and configured to receive a second incoming signal indicative of a second identifying number identifying a telephone from which the incoming call originated; and a data receiver configured to store selected telephone identifying numbers and to associate each stored telephone identifying number with a particular radio frequency, said data receiver configured to respond to receipt by said apparatus of a second incoming signal indicative of a stored telephone identifying number and to tune a radio to the particular radio frequency associated with the indicated stored telephone number so as to provide an audio output of an audio signal derived from the tuned radio signal frequency.

13. An apparatus as claimed in claim 12, wherein said data receiver is further configured to respond to receipt by said apparatus of a second incoming signal indicative of an unstored telephone identifying number and to tune the radio to a default radio frequency.

14. An apparatus as claimed in claim 12, further comprising a ringing circuit configured to provide a ringing signal indicating receipt of the first incoming signal, and wherein said data receiver is further configured to respond to receipt by said apparatus of a second incoming signal indicative of an unstored telephone identifying number and to enable said ringing circuit to provide the ringing signal.

15. An apparatus as claimed in claim 12, wherein said apparatus comprises a cellular telephone.

16. An apparatus as claimed in claim 12, wherein said apparatus comprises a land-line telephone.

17. An apparatus as claimed in claim 12, further comprising a radio configured to be tuned by said data receiver.

18. An apparatus as claimed in claim 12, wherein said data receiver comprises a processing system.

19. An apparatus as claimed in claim 12, wherein said apparatus is configured to respond to receipt of a short message service message and to tune the radio to a radio frequency associated with short message service messages.

20. An apparatus as claimed in claim 12, wherein said apparatus is configured to respond to receipt of a multimedia message service message and to tune the radio to a radio frequency associated with multimedia message service messages.

21. An apparatus, comprising:
a radio section configured to receive radio signals of various radio frequencies, to select a radio signal of one of the radio frequencies, and to provide an audio output of an audio signal derived from the selected radio signal;
a telephone section having a first identifying number and including:
a telephone circuit configured to receive a first incoming signal indicative of the first identifying number, to indicate presence of an incoming call intended for the telephone section, and configured to receive a second incoming signal indicative of a second identifying number identifying a telephone from which the incoming call originated; and
a data receiver configured to store selected telephone identifying numbers and to associate the stored telephone identifying numbers with particular ones of the radio frequencies, said data receiver configured to respond to receipt by said telephone circuit of a second incoming signal indicative of a stored telephone identifying number and to cause said radio section to provide an audio output of an audio signal derived from the particular radio signal frequency associated with the indicated stored telephone identifying number.

22. An apparatus as claimed in claim 21, wherein said data receiver is further configured to respond to receipt by said telephone circuit of a second incoming signal indicative of an unstored telephone identifying number and to cause said radio section to provide an audio output of an audio signal derived from a default radio signal frequency.

23. An apparatus as claimed in claim 21, further comprising a ringing circuit configured to provide a ringing signal indicating receipt of the first incoming signal, and wherein said data receiver is further configured to respond to receipt by said telephone circuit of a second incoming signal indicative of an unstored telephone identifying number and to enable said ringing circuit to provide the ringing signal.

24. An apparatus as claimed in claim 21, wherein said telephone section comprises a cellular telephone.

25. An apparatus as claimed in claim 21, wherein said telephone section comprises a land-line telephone.

26. An apparatus as claimed in claim 21, wherein each of said telephone section and said radio section comprises a discrete component.

27. An apparatus as claimed in claim 21, wherein said data receiver comprises a processing system.

28. An apparatus as claimed in claim 21, wherein said telephone section is configured to respond to receipt of a short message service message and to cause said radio section to provide an audio output of an audio signal derived from a radio signal frequency associated with short message service messages.

29. An apparatus as claimed in claim 21, wherein said telephone section is configured to respond to receipt of a multimedia message service message and to cause said radio section to provide an audio output of an audio signal derived from a radio signal frequency associated with multimedia message service messages.

30. A method comprising:
receiving a first signal indicative of presence of an incoming telephone call;
receiving a second signal indicative of a number identifying a telephone from which the incoming call originated;
determining the indicated number;
associating the determined number with a radio frequency; and
tuning a radio to the associated radio frequency.

31. A method, comprising:
receiving an incoming signal indicative of an incoming call; and
in response to receipt of the incoming signal, selecting a radio signal of a particular radio frequency, and providing an audio output of an audio signal derived from the selected radio signal.

32. A method as claimed in claim 31, further comprising:
receiving a short message service message;
selecting a radio signal of a radio frequency associated with short message service messages; and
providing an audio output of an audio signal derived from the selected radio frequency.

33. A method as claimed in claim 31, further comprising:
receiving a multimedia message service message;
selecting a radio signal of a radio frequency associated with multimedia message service messages; and
providing an audio output of an audio signal derived from the selected radio frequency.

34. A method, comprising:
associating a plurality of telephone identifying numbers with particular radio frequencies;
receiving a first incoming signal indicative of an incoming call;

receiving a second incoming signal indicative of a telephone identifying number identifying a telephone from which the incoming call originated;

upon receipt of a second incoming signal indicative of a telephone identifying number associated with one of the particular radio frequencies, selecting a radio signal of the particular radio frequency associated with the indicated telephone identifying number; and providing an audio output of an audio signal derived from the selected radio signal.

35. A method as claimed in claim 34, further comprising:
upon receipt of a second incoming signal indicative of a telephone identifying number not associated with any of the plurality of radio frequencies, selecting a radio signal of a default radio frequency; and providing an audio output of an audio signal derived from the selected radio signal.

36. A method as claimed in claim 34, further comprising upon receipt of a second incoming signal indicative of a telephone identifying number not associated with any of the plurality of radio frequencies, providing a ringing signal.

37. A method as claimed in claim 34, further comprising:
receiving a short message service message;
selecting a radio signal of a radio frequency associated with short message service messages; and
providing an audio output of an audio signal derived from the selected radio frequency.

38. A method as claimed in claim 34, further comprising:
receiving a multimedia message service message;
selecting a radio signal of a radio frequency associated with multimedia message service messages; and
providing an audio output of an audio signal derived from the selected radio frequency.

39. A method comprising:
receiving a first signal indicative of presence of a telephone call directed to the receiving telephone;
determining whether a second signal has been received indicating a number identifying the telephone from which the incoming telephone call originated;
if the second signal was not received, determining a default radio frequency;
if the second signal was received, determining the number identifying the telephone from which the incoming telephone call originated;
determining whether a radio frequency is associated with the determined number;
if a radio frequency is not associated with the determined number, determining a default radio frequency;
if a radio frequency is associated with the determined number, determining the associated radio frequency; and
tuning a radio to the determined radio frequency.

40. A method comprising:
receiving a first signal indicative of presence of a telephone call directed to the receiving telephone;
disabling the ringing circuit of the receiving telephone from responding to the first signal;
determining whether a second signal has been received indicating a number identifying the telephone from which the incoming telephone call originated;
if the second signal was not received, enabling the ringing circuit of the receiving telephone to respond to the first signal so as to indicate the presence of the telephone call;
if the second signal was received, determining the number identifying the telephone from which the incoming telephone call originated;
determining whether a radio frequency is associated with the determined number;

if a radio frequency is not associated with the determined number, enabling the ringing circuit of the receiving telephone to respond to the first signal so as to indicate the presence of the telephone call; and
if a radio frequency is associated with the determined number, tuning a radio to the associated radio frequency.

41. A method comprising:
receiving a signal indicative of presence of an incoming short message service message; and
tuning a radio to a radio frequency associated with short message service messages.

42. A method comprising:
receiving a signal indicative of presence of an incoming multimedia message service message; and
tuning a radio to a radio frequency associated with multimedia message service messages.

43. An apparatus, comprising a storage medium having instructions stored thereon, the instructions when executed perform a method comprising:
indicating a telephone number identifying a telephone from which an incoming telephone call is originating by responding to receipt of a first signal indicative of presence of an incoming telephone call and receipt of a second signal indicative of a number identifying a telephone from which the incoming call originated by determining the indicated number;
associating the determined number with a radio frequency; and
tuning a radio to the associated radio frequency.

44. An apparatus, comprising a storage medium having instruction stored thereon, the instructions when executed perform a method comprising:
indicating presence of an incoming call by responding to receipt of an incoming signal indicative of the incoming call by selecting a radio signal of a particular radio frequency; and
providing an audio output of an audio signal derived from the selected radio signal.

45. An apparatus as claimed in claim 44, wherein the method further comprises:
responding to receipt of a short message service message by selecting a radio signal of a radio frequency associated with short message service messages; and
providing an audio output of an audio signal derived from the selected radio signal.

46. An apparatus as claimed in claim 44, wherein the method further comprises:
responding to receipt of a multimedia message service message by selecting a radio signal of a radio frequency associated with multimedia message service messages; and
providing an audio output of an audio signal derived from the selected radio signal.

47. An apparatus, comprising a storage medium having instructions stored thereon, the instructions when executed perform a method comprising:
indicating presence of an incoming call by responding to receipt of a first incoming signal indicative of the incoming call and receipt of a second incoming signal indicative of an identifying number identifying a telephone from which the incoming call originated by selecting a radio signal associated with the indicated identifying number; and
providing an audio output of an audio signal derived from the selected radio signal; and wherein the instructions when executed further respond to receipt of a short message service message by selecting a radio signal of a radio frequency associated with short message service messages; and providing an audio output of an audio signal derived from the selected radio signal.

48. An apparatus as claimed in claim 47, wherein the method further comprises:
responding to receipt of a second incoming signal indicative of an identifying number identifying a telephone for which there is not an associated radio signal by selecting a default radio signal; and
providing an audio output of an audio signal derived from the default radio signal.

49. An apparatus as claimed in claim 47, wherein the method further comprises:
responding to receipt of a second incoming signal indicative of an identifying number identifying a telephone for which there is not an associated radio signal by providing a ringing signal.

50. An apparatus, comprising a storage medium having instructions stored thereon, the instructions when executed perform a method comprising:
indicating presence of an incoming call by responding to receipt of a first incoming signal indicative of the incoming call and receipt of a second incoming signal indicative of an identifying number identifying a telephone from which the incoming call originated by selecting a radio signal associated with the indicated identifying number; and
providing an audio output of an audio signal derived from the selected radio signal; and wherein the insturctions when executed further respond to receipt of a multimedia message service message by selecting a radio signal of a radio frequency associated with multimedia message service messages; and providing an audio output of an audio signal derived from the selected radio signal.

51. An apparatus, comprising a storage medium having instructions stored thereon, the instructions when executed perform a method comprising:
indicating a telephone number identifying a telephone from which has originated a telephone call directed to a receiving telephone by responding to receipt of a first signal indicative of presence of a telephone call directed to the receiving telephone by determining whether a second signal has been received indicating a number identifying the telephone from which the incoming telephone call originated;
if the second signal was not received, determining a default radio frequency;
if the second signal was received, determining the number identifying the telephone from which the incoming telephone call originated;
determining whether a radio frequency is associated with the determined number;
if a radio frequency is not associated with the determined number, determining a default radio frequency;
if a radio frequency is associated with the determined number, determining the associated radio frequency; and
tuning a radio to the determined radio frequency.

52. An apparatus, comprising a storage medium having instructions stored thereon, the instructions when executed perform a method comprising:
indicating a telephone number identifying a telephone from which originated a telephone call directed to a receiving telephone having a ringing circuit for indicating receipt of a telephone call directed to the receiving telephone by responding to receipt of a first signal indicative of presence of a telephone call directed to the receiving telephone by disabling the ringing circuit from responding to the first signal;
determining whether a second signal has been received indicating a number identifying the telephone from which the incoming telephone call originated;
if the second signal was not received, enabling the ringing circuit to respond to the first signal so as to indicate the presence of the telephone call;
if the second signal was received, determining the number identifying the telephone from which the incoming telephone call originated;
determining whether a radio frequency is associated with the determined number;
if a radio frequency is not associated with the determined number, enabling the ringing circuit to respond to the first signal so as to indicate the presence of the telephone call; and
if a radio frequency is associated with the determined number, tuning a radio to the associated radio frequency.

53. An apparatus, comprising a storage medium having instructions stored thereon, the instructions when executed perform a method comprising:
indicating receipt of a signal indicative of presence of an incoming short message service message by tuning a radio to a radio frequency associated with short message service messages.

54. An apparatus, comprising a storage medium having instructions stored thereon, the instructions when executed perform a method comprising:
indicating receipt of a signal indicative of presence of an incoming multimedia message service message by tuning a radio to a radio frequency associated with multimedia message service messages.

55. An apparatus as claimed in claim 50, wherein the method further comprises:
responding to receipt of a second incoming signal indicative of an identifying number identifying a telephone for which there is not an associated radio signal by selecting a default radio signal; and
providing an audio output of an audio signal derived from the default radio signal.

56. An apparatus as claimed in claim 50, wherein the method further comprises:
responding to receipt of a second incoming signal indicative of an identifying number identifying a telephone for which there is not an associated radio signal by providing a ringing signal.

57. The apparatus as claimed in claim 2, wherein said radio section comprises a one-way radio receiver configured to receive and amplify audio signals transmitted from a radio transmitter.

58. The apparatus as claimed in claim 2, wherein said radio section comprises one of an amplitude modulation (AM) radio receiver and a frequency modulation (FM) radio receiver.

59. The method of claim 34, wherein providing said audio output comprises receiving radio waves corresponding to audio signals at a radio receiver received from a radio transmitter, and amplifying said audio signals.

60. The method of claim 34, wherein providing said audio output comprises receiving radio signals with one of an AM radio receiver and an FM radio receiver.

* * * * *